United States Patent [19]
Alley

[11] 4,427,204
[45] Jan. 24, 1984

[54] MECHANICAL END FACE SEAL
[76] Inventor: David W. Alley, Rte. #1, Box 1003, Hemphill, Tex. 75948
[21] Appl. No.: 458,180
[22] Filed: Jan. 17, 1983
[51] Int. Cl.³ ............................................. F16J 15/34
[52] U.S. Cl. .................................... 277/85; 277/177; 277/189
[58] Field of Search ................... 277/189, 177, 85, 86, 277/38–42

[56] References Cited
U.S. PATENT DOCUMENTS

| | | | |
|---|---|---|---|
| 2,593,193 | 4/1952 | Rockwell | 277/177 |
| 2,729,478 | 1/1956 | Chambers et al. | 277/85 |
| 4,303,250 | 12/1981 | Persson | 277/189 |
| 4,331,338 | 5/1982 | Caldwell et al. | 277/177 |

Primary Examiner—Robert I. Smith
Attorney, Agent, or Firm—Neal J. Mosely

[57] ABSTRACT

An improved end face seal assembly comprises a wall mounted seat assembly having an axial sealing end face and an abutting shaft mounted sealing head assembly having an axial sealing end face slidably engaged therewith to provide a primary dynamic seal. The seat assembly has a peripheral O-ring to provide a secondary static seal at the wall mounting. The sealing head assembly comprises a cup shaped cylindrical retainer mounted on a rotating shaft by set screws. Contained within the retainer are a plurality of compression springs, a flat cylindrical disc, and a cylindrical washer. The washer having a sealing end face at one end and a counterbore at the other is captured in the retainer by a snap ring in the retainer engaging an annular shoulder on the washer. A cylindrical O-ring holder having an external O-ring and two internal O-rings provides a secondary seal between the shaft and washer. Spring force maintains contact between the rotating sealing face of the washer and the stationary sealing face of the seat to maintain the primary dynamic seal.

20 Claims, 4 Drawing Figures

MECHANICAL END FACE SEAL

BACKGROUND OF THE INVENTION

1. FIELD OF THE INVENTION

This invention relates to the field of mechanical seals, and more particularly to a mechanical end face seal having a novel construction for sealing a rotating shaft against fluid leakage.

2. BRIEF DESCRIPTION OF THE PRIOR ART

Establishing a seal between a rotating shaft and the wall of a container while preventing the fluid in the container from escaping can be quite difficult. The shaft must be sealed in both its static and dynamic condition with the same sealing device.

Mechanical end face seals are commonly used in such applications. A mechanical end face seal has been defined as a machine element that prevents fluid from escaping a container at a rotating shaft extending through its housing utilizing axial force to keep the end faces of the primary sealing elements, which are 90° to the shaft axis, in contact.

Primary sealing elements in common mechanical end face seals consist of a seat inserted into the housing wall and a washer riding against the seat. The primary dynamic seal takes place at the contacting end faces of the two elements. To compensate for wear between the two sliding faces and maintain face contact, the washer is held against the seat by means of one or more springs. The springs are contained in a retainer which is attached to the shaft by set screws or other means. The retainer may have drive dents that engage in mating grooves of the washer, and as the shaft rotates, the entire seal head (retainer, springs, and washer) rotates with it.

Many material combinations have been used for the primary sealing element faces such as; carbon running against cast iron, Ni-resist, ceramic, Stellite, or tungsten carbide.

Secondary sealing elements are provided since the primary sealing elements are separate pieces. O-rings are widely used for this purpose. An O-ring is commonly placed between the outside diameter of the seat and the inside diameter of the wall housing to provide a static seal. Placing another O-ring between the outside diameter of the shaft and the inside diameter of the washer provides a semi-static seal. Since the washer moves slightly forward as the washer face wears down, it is not a true static seal.

Prior art seals of this type are shown in Bulletin No. S-2021, "End Face Shaft Seals" by Crane Packing Company, 6400 Oakton St., Morton Grove, Ill. 60053.

Failure of mechanical end face seals is often due to loss of the secondary O-ring seal between the outside diameter of the shaft and the inside diameter of the washer. Major causes of the loss are vibration and shaft galling due to abrasive particles in the fluid being handled packing in the annular opening between the shaft and the washer. Since these seals often compensate for vibration due to shaft misalignment and are used in applications involving abrasive and corrosive material handling, replacement and costly down time is a common occurrence. It is not unusual for these seals to require replacement as often as every month.

There has been a need for a mechanical end face seal having improved secondary sealing characteristics that will prolong the seal life of the assembly and provide resistance to shaft galling.

SUMMARY OF THE INVENTION

It is therefore an object of the present invention to provide an improved mechanical end face seal that will prevent fluid from escaping a container at a rotating shaft.

Another object of this invention is to provide an improved mechanical end face seal that utilizes axial force to keep the end faces of the primary sealing elements in contact.

Another object of this invention is to provide an improved mechanical end face seal that will help dampen vibration.

Another object of this invention is to provide an improved mechanical end face seal that will resist shaft galling.

Another object of this invention is to provide an improved mechanical end face seal that will withstand high fluctuating pressures.

A further object of this invention is to provide an improved mechanical end face seal that effectively seals critical parts of the seal from abrasives.

A still further object of this invention is to provide an improved mechanical end face seal that will eliminate seal damage due to slippage on the shaft.

A still further object of this invention is to provide an improved mechanical end face seal which will have long life and not require frequent replacement.

Other objects of the invention will become apparent from time to time throughout the specification and claims as hereinafter related.

The above noted objects and other objects of the invention are accomplished by an improved end face seal assembly comprising a wall mounted seat assembly having an axial sealing end face and an abutting shaft mounted sealing head assembly having an axial sealing end face slidably engaged therewith to provide a primary dynamic seal. The seat assembly has a peripheral O-ring to provide a secondary static seal at the wall mounting. The sealing head assembly comprises a cup shaped cylindrical retainer mounted on a rotating shaft by setscrews. Contained within the retainer are a plurality of compression springs, a flat cylindrical disc, and a cylindrical washer. The washer having a sealing end face at one end and a counterbore at the other is captured in the retainer by a snap ring in the retainer engaging annular shoulder on the washer. A cylindrical O-ring holder having an external O-ring and two internal O-rings provides a secondary seal between the shaft and washer. Spring force maintains contact between the rotating sealing face of the washer and the stationary sealing face of the seat to maintain the primary dynamic seal. This seal is characterized by extended life under adverse conditions and does not require frequent replacement.

DESCRIPTION OF THE PREFERRED EMBODIMENT

Figure 1:
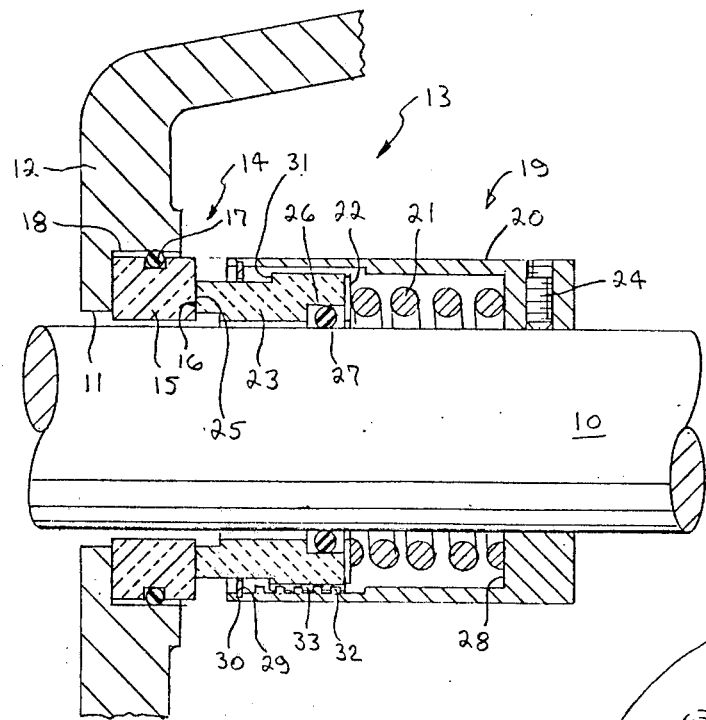
FIG. 1 is a view in longitudinal central section of a typical prior art mechanical end face seal.

Referring now to the drawings by numerals of reference and particularly to FIG. 1, there is shown a rotating shaft 10, e.g. pump, motor, etc., passing through opening 11 in container wall 12. A typical prior art mechanical end face seal assembly designated generally as 13 is shown installed in operative cooperation between the shaft 10 and the wall 12. Seat assembly 14 comprises a seat 15 having a sealing end face 16 and an annular O-ring 17 installed in counterbore 18 of wall 12. O-ring 17 forms a secondary static seal between the inside diameter of counterbore 18 and the outside diameter of seat 15.

Seal head assembly 19 comprising a generally cup shaped cylindrical retainer 20 which contains a compression spring 21, disc 22, and a cylindrical washer 23, is attached to the outside diameter of shaft 10 by set screws 24. Cylindrical carbon washer 23 has a sealing end face 25 at one end and a counterbore 26 at its other end. O-ring 27 is installed in the counterbore 26 to form a semi-static seal between the outside diameter of the shaft 10 and the counterbore 26.

Retainer 20 is provided with a spring biasing shoulder 28 near one end. Disc 22 is located at the counterbored end of carbon washer 23 and partially covers the counterbore 26. Compression spring 21 having one end against shoulder 28 and its other end against disc 22 urges washer 23 away from the shoulder 28. Retainer contains a snap ring 29 installed in snap ring groove 30 at its open end opposite the shoulder 28.

Washer 23 is provided with an annular shoulder 31 having a larger diameter than the inside diameter of the snap ring 29, to retain it inside the retainer 20. The inside diameter of retainer 20 contains drive dents 32 which engage in mating groove 33 on the outside diameter of washer 23, and as the shaft 10 rotates, the entire seal head assembly 19 rotates with it. Spring force maintains contact between the rotating seal face 25 of carbon washer 23 and the stationary sealing face 16 of seat 15 to establish and maintain the primary dynamic seal.

In the operation of the prior art seal assembly, as just described, the carbon washer 23 transmits a vibration to O-ring 27. The vibration of O-ring 27, particularly in the operating environment, causes fretting or galling of the shaft 10 with the result that the seal assembly develops leakage between the O-ring and the shaft. This has necessitated monthly replacement of the seal assemblies in many applications and also frequent need for refinishing of the motor or pump shaft 10.

Figure 2:
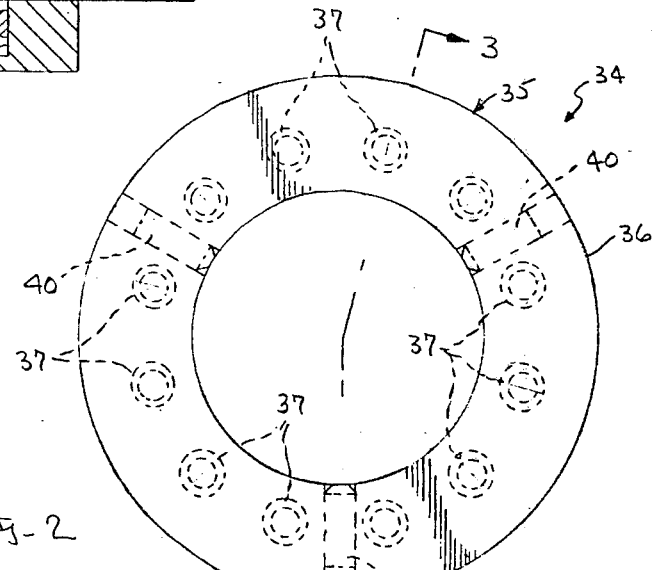
FIG. 2 is a right end view of the improved mechanical end face seal assembly representing a preferred embodiment of this invention.
Figure 3:
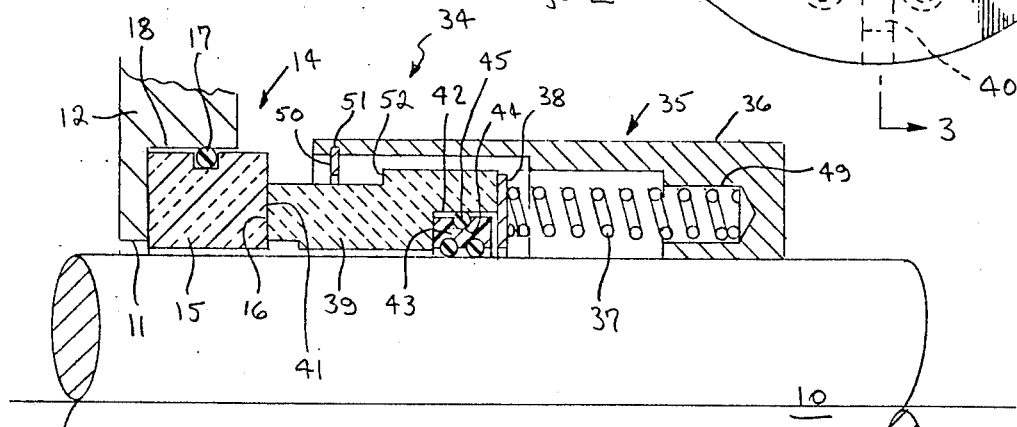
FIG. 3 is a cross sectional view of the improved seal of this invention taken along line 3—3 of FIG. 2.
Figure 3:
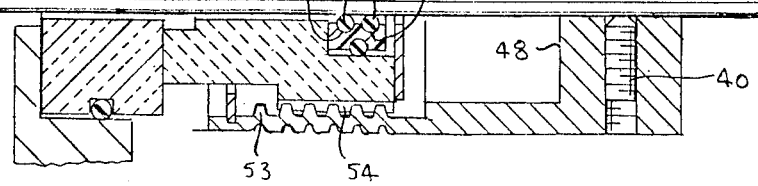

FIGS. 2 and 3 show an improved mechanical end face seal assembly 34 representing a preferred embodiment of this invention. As in FIG. 1 (prior art), there is shown a rotating shaft 10 passing through opening 11 in container wall 12, and seat assembly 14 comprising seat 15 having a sealing end face 16 and an annular O-ring 17 is installed in counterbore 18 of wall 12. O-ring 17 forms a secondary static seal between the inside diameter of counterbore 18 and the outside diameter of seat 15.

Seal head assembly 35 comprising a generally cup shaped cylindrical retainer 36 which contains a plurality of compression springs 37, disc 38, and a cylindrical carbon washer 39, is attached to the outside diameter of shaft 10 by set screws 40. Cylindrical washer 39 has a sealing end face 41 at one end and a counterbore 42 at its other end.

Figure 4:
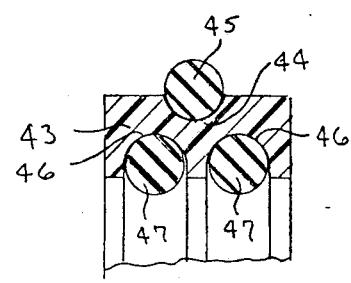
FIG. 4 is an enlarged cross sectional detail of a segment of the O-ring holder of the improved mechanical end face seal.

A cylindrical O-ring holder 43 (FIGS. 3 and 4) of suitable material such as molded carbon-filled "Teflon" (trademark of Dupont) resin is installed in the counterbore 42. The outside diameter of O-ring holder 43 is provided with a centrally located annular peripheral groove 44 of semicircular cross section. O-ring 45 is installed in annular groove 44 forming a seal between the outside diameter of the holder 43 and the inside diameter of the counterbore 42. The inside diameter of O-ring holder 43 contains two equally spaced annular grooves 46, each of semicircular cross section. O-rings 47 are installed in grooves 46 forming a seal between the outside diameter of the shaft 10 and the O-ring holder 43.

Retainer 36 is provided with a spring biasing shoulder 48 near one end. A plurality of equally spaced holes 49 are drilled in shoulder 48 to accept a plurality of small compression springs 37 (FIG. 3). Disc 38 is located at the counterbored end of washer 39 and partially covers the counterbore 42 and O-ring holder 43. Compression springs 37 having one end installed in holes 49 and their other ends against disc 38 provide uniform loading to urge washer 39 away from the shoulder 48. Retainer 36 contains a snap ring 50 installed in snap ring groove 51 at its open end opposite the shoulder 48.

Carbon washer 39 is provided with an annular shoulder 52 having a larger diameter than the inside diameter of the snap ring 50, to retain the washer inside the retainer 36. The inside diameter of retainer 36 contains drive dents 53 which engage in mating groove 54 on the outside diameter of washer 39, and as the shaft 10 rotates, the entire seal head assembly 35 rotates with it. Spring force maintains contact between the rotating sealing face 41 of washer and the stationary sealing face 16 of seat 15 to establish and maintain the primary dynamic seal. It has been found that the improved mechanical end face seals, as described above, far outlast conventional seals and alleviate the problem of loss of the secondary O-ring seal between the outside diameter of the shaft and the inside diameter of the washer caused by vibration and shaft galling. In fact, in an extended test run, one of the improved seal assemblies was run for more than one year in a very severe environment before it failed. Even then, the failure was in the wearing out of the end face 16 of carbon washer 39. After this extended run, there was not galling or even any appreciable wear at the points of contact of O-rings 47 with the shaft 10. It appears that the use of the two O-rings in contact with the shaft and the single O-ring in contact with the bore of the washer transfers the point of wear to the inside of the washer. Thus, after a long period of wear, the washer is replaced but the shaft does not have to be refinished.

While this invention has been described fully and completely with special emphasis upon a preferred embodiment, it should be understood that within the scope of the appended claims the invention may be practiced otherwise than as specifically described herein.

I claim:

1. A mechanical end face seal assembly for a rotary shaft comprising;

a cylindrical stationary seat surrounding said shaft, having a central bore and at least one sealing end face, a cylindrical washer surrounding said shaft and movable longitudinally thereof into sealing engagement with said seat end face, said washer having a central bore and a sealing face at one end engageable with said seat end face and having a counterbore at the other end, a hollow cylindrical O-ring retainer surrounding said shaft and positioned within said washer counterbore, said O-ring retainer having a centrally located peripheral groove on its outer surface and at least two laterally-spaced, substantially-parallel, peripheral grooves in the inner surface thereof, an O-ring positioned in said O-ring retainer outer groove to form a seal between said outer surface of said O-ring retainer and said washer counterbore, a plurality of O-rings positioned one in each of said inner surface grooves in said O-ring retainer to form a seal between the outside diameter of said shaft and said O-ring holder and supporting said retainer on said shaft with substantially no wear thereon during extended periods of operation, and spring means biasing said washer longitudinally of said shaft into sealing engagement with said seat.

2. An end face seal assembly according to claim 1 wherein
each of said grooves in said O-ring retainer is semicircular in cross section.

3. An end face seal assembly according to claim 1 wherein
said spring means comprises at least one compression spring.

4. An end face seal assembly according to claim 1 including
means to support said washer, O-ring retainer, and O-rings in substantially non-rotating relation to said shaft.

5. An end face seal assembly according to claim 1 including
means to support said washer, O-ring retainer, and O-rings in substantially non-rotating relation to said shaft and rotate said washer with said shaft in relation to said seat.

6. An end face assembly according to claim 1 including
a hollow cylindrical retainer having an inside diameter forming an open end and a smaller central bore providing a shoulder therein,
said spring means being positioned within said retainer compressed between said shoulder and said washer,
means for releasably attaching said retainer to a shaft,
drive means on said retainer cooperable with said washer to rotate the entire assembly relative to said seat, and
said sealing faces of said washer and said seat being maintained in sealing contact by said spring means to provide a dynamic pressure seal therebetween.

7. An end face seal assembly according to claim 6 wherein
said retainer attachment means comprises at least one setscrew.

8. An end face seal assembly according to claim 6 includes
a snap ring in the open end thereof for retaining said washer during assembly.

9. An end face seal assembly according to claim 6 wherein
said drive means comprises drive dents on the inside diameter of said retainer and grooves on the outside diameter of said washer in which said dents are positioned.

10. A removable mechanical end face seal assembly for a rotary shaft comprising;
a cylindrical seat member adapted to be removably positioned surrounding a rotating shaft, having a central bore and at least one sealing end face,
a removable sealing assembly comprising a cylindrical washer,
means surrounding said washer and supporting the same for movement longitudinally thereof into sealing engagement with said seat end face when installed on a rotating shaft,
said washer having a central bore and a sealing face at one end for engagement with said seat end face and having a counterbore at the other end,
a hollow cylindrical O-ring retainer positioned within said washer counterbore,
said O-ring retainer having a centrally located peripheral groove on its outer surface and at least two laterally-spaced, substantially-parallel, peripheral grooves in the inner surface thereof,
an O-ring positioned in said O-ring retainer outer groove to form a seal between said outer surface of said O-ring retainer and said washer counterbore,
a plurality of O-rings positioned one in each of said inner surface grooves in said O-ring retainer to form a seal between the outside diameter of a rotating shaft and said O-ring holder, and
spring means biasing said washer longitudinally of said shaft into sealing engagement with said seat when installed on a rotating shaft.

11. A removable mechanical end face seal assembly according to claim 10 wherein
each of said grooves in said O-ring retainer is semicircular in cross section.

12. A removable mechanical end face seal assembly according to claim 10 wherein
said spring means comprises at least one compression spring.

13. A removable mechanical end face seal assembly according to claim 10 including
means to support said washer, O-ring retainer, and O-rings in substantially non-rotating relation to a rotating shaft when installed.

14. A removable mechanical end face seal assembly according to claim 10 including
means to support said washer, O-ring retainer, and O-rings in substantially non-rotating relation to a rotating shaft and rotate said washer with said shaft in relation to said seat when installed.

15. A removable mechanical end face seal assembly according to claim 10 including
a hollow cylindrical retainer having an inside diameter forming an open end and a smaller central bore providing a shoulder therein,
said spring means being positioned within said retainer compressed between said shoulder and said washer,
means for releasably attaching said retainer to a rotating shaft,
drive means on said retainer cooperable with said washer to rotate the entire assembly relative to said seat, and
said sealing faces of said washer and said seat being maintained in sealing contact by said spring means to provide a dynamic pressure seal therebetween when installed on a rotating shaft.

16. A removable mechanical end face seal assembly according to claim 15 wherein
   said retainer attachment means comprises at least one setscrew.

17. A removable mechanical end face seal assembly according to claim 15 wherein
   said drive means comprises drive dents on the inside diameter of said retainer and grooves on the outside diameter of said washer in which said dents are positioned.

18. An O-ring subassembly, for use in mechanical end face seal assemblies, comprising
   a hollow cylindrical retainer having an inside diameter forming an open end and a smaller central bore providing a shoulder therein,
   a cylindrical holder, fitting inside said retainer smaller bore against said shoulder, having a central bore with at least two annular grooves in the inner surface thereof,
   said holder having a centrally located groove on its outside diameter,
   an O-ring positioned in each of said grooves in said holder central bore for bearing on a shaft to be sealed, and
   an O-ring positioned in said groove on said outer surface of said holder against the larger diameter inner surface of said retainer.

19. An O-ring subassembly according to claim 18 in which
   said outer and inner grooves are each semicircular in cross section and said O-rings are positioned one in each of said grooves.

20. An O-ring seal subassembly according to claim 18 wherein
   said O-ring holder is constructed of molded carbon-filled Teflon.

* * * * *